UNITED STATES PATENT OFFICE.

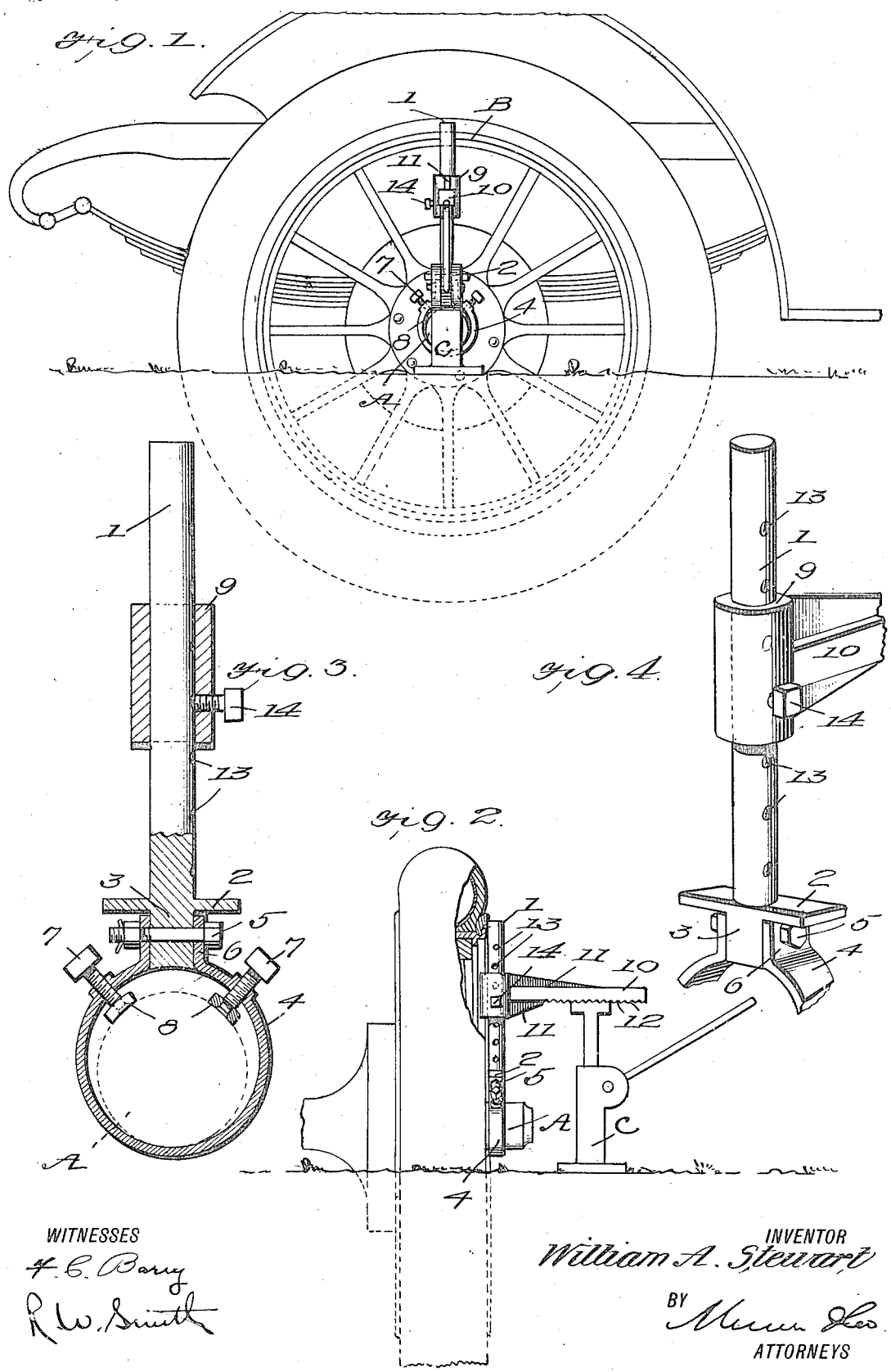

WILLIAM ARTHUR STEWART, OF BELFAST, MAINE.

AUTOMOBILE-JACK.

1,238,591.   Specification of Letters Patent.   Patented Aug. 28, 1917.

Application filed November 10, 1916.  Serial No. 130,657.

*To all whom it may concern:*

Be it known that I, WILLIAM A. STEWART, a subject of the King of Great Britain, and a resident of Belfast, in the county of Waldo and State of Maine, have invented a certain new and useful Improvement in Automobile-Jacks, of which the following is a specification.

The object of my invention is to provide an attachment to be secured to the hub cap of the wheel of an automobile, and used in connection with a standard lever or other type jack, for lifting the wheel from a mud hole when it has become mired.

A further object of my invention is to provide such an attachment which may be readily secured in operative position, or as quickly removed, and which will be of strong but simple and inexpensive construction.

Other objects of the device will appear as the description proceeds, my invention residing in the construction, combination and arrangement of parts to be hereinafter described and claimed, and illustrated in the accompanying drawings in which like reference characters indicate like parts throughout the several views.

Figure 1 is a side elevation of the rear of an automobile showing one of the wheels sunk in a mud hole and my improved jack in operative position.

Fig. 2 is a rear view partly broken away of a mired wheel showing my jack connected thereto.

Fig. 3 is a rear elevation partly in section of the invention.

Fig. 4 is a perspective fragmentary view of the device.

In the drawings, a standard 1 is shown, having a squared lower end 3 and provided with a shoulder 2 above the said end. A metallic band 4, adapted to encircle the hub cap A of an automobile wheel, is fastened to the lower end of the standard 1 by a bolt 5 passing through ears 6 formed upon each end of the band 4, and the squared end 3 of the above-mentioned standard. The band 4 is of a size appreciably larger than the hub cap, and is secured thereto by thumb screws 7 extending through the said band at each side of the ears 6, and having bearing heads 8 formed upon their inner ends adapted to engage the hub cap as shown in Figs. 2 and 3. The standard 1 is of such length that its upper end will bear against the rim B of the wheel, when the band 4 is secured to the hub cap, thereby bracing the standard and preventing the same from swinging rearwardly.

A sleeve 9 is adapted to slide upon the standard 1, and is formed integral with an outwardly extending arm 10, and flange braces 11, between the said sleeve and the upper and lower faces of the arm respectively. The arm 10 is made of any convenient length and the lower face thereof is serrated as shown at 12.

The arm 10 is secured at any desired height upon the standard 1, by a set screw 14 extending through the sleeve 9 and adapted to engage any one of a series of counter sunk holes 13 formed in the standard 1 at convenient heights.

When using my attachment, the wheel of an automobile having sunk in a mud hole or ditch, the band 4 is clamped upon the hub cap of the wheel by the screws 7, with the standard 1 extending upwardly and having its upper end bearing against the rim of the wheel at the upper portion thereof, to firmly hold the standard in position. Thus it will be seen that the standard is attached to that portion of the wheel which is not in the mud, and it will therefore not be necessary to dig a hole adjacent the mired portion of the wheel in order to secure the standard in position.

A jack C such as forms part of the standard equipment of all automobiles is then placed on the solid ground at the edge of the mud hole, and the arm 10 is secured upon the standard 1 at such a height that it will lie above the head of the jack, when the latter is in its lowered position. The arm 10 extending laterally from the standard 1 a considerable distance, it will be seen that the jack may be positioned below its outer end, although, of necessity, the jack will have to be set up at some distance from the mired wheel. By elevating the jack head, which will engage the arm 10, the latter will be raised, elevating the standard 1 and the mired wheel which is clamped thereto, so that the hole beneath the wheel may be filled in to form a solid surface for the wheel.

Thus it will be seen that I have provided a device by using which it becomes unnecessary to dig a hole beneath the hub of a mired automobile wheel before a jack can be placed in position to raise the same, and which may be quickly attached to and removed from the hub of the mired wheel.

I claim:—

1. An attachment for a vehicle wheel comprising a standard, a gripping band having upturned ears upon its ends secured to the lower end of the said standard, the said band being adapted to encircle the hub cap of a wheel with the upper end of the said standard arranged to bear against the rim of a wheel, screws extending through the said band and having bearing heads upon their inner ends adapted to engage the said hub cap, a sleeve having an outwardly extending arm and braces between the said sleeve and arm formed integral therewith, and adapted for adjustment along the said standard, the said standard having a series of counter sunk holes therein, and a set screw extending through the above mentioned sleeve and adapted to engage one of the said holes to secure the said arm at the desired height.

2. An attachment for a vehicle wheel comprising a standard, a clamping member at its lower end adapted to engage the hub of a wheel, the upper end of the said standard being adapted to bear against a wheel rim, and an outwardly extending arm secured to the said standard, said arm being of a length to extend beyond the hub of a wheel and with the outer end of which an elevating device is adapted to be engaged to elevate the wheel.

3. An attachment for a vehicle wheel comprising a standard, a gripping band having upturned ears upon its end secured to the lower end of the said standard, the said band being adapted to encircle the hub cap of a wheel, screws extending through the said band and having bearing heads upon their inner ends adapted to engage the said hub cap, and an outwardly extending arm secured to the said standard as and for the purpose specified.

4. An attachment for a vehicle wheel, comprising a standard having at the inner end means for clamping it to the hub of a wheel with its outer end bearing against the rim of the wheel, and an arm adjustably mounted on the standard and projecting at right angles from the standard and beyond the hub of the wheel to permit an elevating device to be arranged below and in engagement with the outer end thereof, to elevate the wheel.

WILLIAM ARTHUR STEWART.